(12) United States Patent  (10) Patent No.: US 8,291,511 B2
Riemenschneider et al.  (45) Date of Patent: Oct. 16, 2012

(54) APPARATUS AND METHOD FOR INVESTIGATING BIOLOGICAL SYSTEMS AND SOLID SYSTEMS

(75) Inventors: Leif Riemenschneider, Dresden (DE); Gerd Hoffmann, Fuerth (DE)

(73) Assignee: Nambition GmbH, Dresden (DE)

( * ) Notice: Subject to any disclaimer, the term of this patent is extended or adjusted under 35 U.S.C. 154(b) by 145 days.

(21) Appl. No.: 12/519,568

(22) PCT Filed: Dec. 28, 2006

(86) PCT No.: PCT/EP2006/012586
§ 371 (c)(1),
(2), (4) Date: Dec. 15, 2009

(87) PCT Pub. No.: WO2008/083694
PCT Pub. Date: Jul. 17, 2008

(65) Prior Publication Data
US 2010/0146673 A1  Jun. 10, 2010

(51) Int. Cl.
*G01B 5/28* (2006.01)
(52) U.S. Cl. ................................. 850/5; 850/33; 73/105
(58) Field of Classification Search .................. 850/5, 6, 850/14, 33; 73/105
See application file for complete search history.

(56) References Cited

U.S. PATENT DOCUMENTS

| 5,077,473 | A | 12/1991 | Elings et al. | |
|---|---|---|---|---|
| 5,467,642 | A * | 11/1995 | Hosaka et al. | 73/105 |
| 7,013,717 | B1 * | 3/2006 | Struckmeier et al. | 73/105 |
| 7,387,035 | B2 * | 6/2008 | Struckmeier et al. | 73/862.51 |

FOREIGN PATENT DOCUMENTS

| EP | 0596494 A2 | 5/1994 |
|---|---|---|
| JP | 06117846 A | 4/1994 |

OTHER PUBLICATIONS

Masayaki, Abe et al., "Atom tracking for reproducible force spectroscopy at room temperature with non-contact atomic force microscopy", Nanotechnology, IOP, Bristol, GB, vol. 16, Nr. 12, pp. 3029-3034, Oct. 28, 2005, ISSN 0957-4484.

* cited by examiner

*Primary Examiner* — Kiet T Nguyen
(74) *Attorney, Agent, or Firm* — Hooker & Habib, P.C.

(57) ABSTRACT

Proposed is a procedure for carrying out a scanning probe microscopic or atomic force spectroscopic measurement within predetermined parameters, which said procedure encompasses the following steps: a determination of a value variance of at least one of the parameters, and control of an adjustment member in relation to said variance, so that the variance is at least partially compensated for.

24 Claims, 5 Drawing Sheets

APPARATUS AND METHOD FOR INVESTIGATING BIOLOGICAL SYSTEMS AND SOLID SYSTEMS

SCOPE OF THE INVENTION

The present invention concerns apparatuses and methods for the investigation of biological systems as well as solid body systems and is especially concerned regarding such apparatuses and systems as call for scanning probe microscopy and/or atomic force spectroscopy.

BACKGROUND OF THE INVENTION

Biological systems and the processes operating therein, rest upon action of reciprocally interacting molecules. Molecular forces found in biological systems differentiate themselves from other molecular systems, especially in regard to chemical reactions and physical variations occurring within an entire system. Statements regarding biological, molecular reciprocation indicate that such systems should be analyzed and further investigations are to be carried out before more advanced comments about them are made.

For the investigation of measurements of molecular alternating action in biological systems, scanning probe microscopic equipment is employed in order to determine surface topographies with high lateral and vertical optical resolution. For example, a "lateral resolution" is a resolution in the plane of a surface of a biological system, which surface is under investigation. Similarly, a resolution vertically aligned thereto is designated as a "vertical resolution".

Examples of scanning probe microscopy would encompass equipment such as scanning force microscopy (SFM) or atomic force spectroscopy (AFS).

In the case of atomic force microscopic equipment, besides the topography of a surface of a biological sample, the flexibility thereof and/or its inherent adhesive force is measured. Atomic force microscopy, in this case, is normally referred to as "Atomic Force Spectroscopy". Atomic force spectroscopy detects molecular forces of a sample and does so with a probe which can directly contact the sample. Alternating action between interactive molecules can be quantitatively detected in this manner. A probe, supported on a cantilever, possesses a pointed tip. When engaged in an examination, a probe traverses over the surface of a sample, (or a sample is moved under a stationary probe) whereby the lateral and the vertical positions and/or linkages of the sample can be recorded and displayed.

Movements of the probe relative to the sample are enabled by the flexible characteristics of both the probe and its cantilever. On the basis of determined lateral and vertical positions and/or diversions of the sample, molecular forces acting on the sample are determined and therefrom, the topography of the sample is established.

Under usual procedure, movements of a sample, which are determined by optical instrumentation, detect resolutions of approximately 0.1 nm and simultaneously can detect forces of a few pN.

In order to determine surface topography or other characteristics of a biological sample, the surfaces of the sample and the probe of a scanning microscope are brought into contact with one another. The purpose of this is to determine that a force, acting between the two, lies within a predetermined range of, in some cases, 50-100 pN. Thereafter, the sample and the probe are laterally displaced relative to one another, so that a gridlike scan of the surface of the sample is carried out. Following this action, the sample and/or the probe are then separated vertically in order to maintain a predetermined force acting between them. Movements of the probe and the sample relative to one another can be carried out by an appropriate device, which employs a piezo-ceramic actuator.

High resolutions of position or force are very sensitive to variation when their operating equipment is exposed to external disturbances, in one instance, ambient thermal effects can lead to bending of the cantilever. Since the degree of displacement of the cantilever can typically be caused by laser beam variance or by thermal or surface effects, such bending of the cantilever leads to a correction value which is then applied to the measured values. Thermal effects, also cause a variation in the separating distance between the probe and the sample, whereby the force between the probe and the sample is altered. Thermal variations are typically made slowly and occupy long time periods. Therefor, such variations are commonly known as "drifts". Such drifts are based also on other influences, including thermally induced, substantial positional variations in adjustment means, or variances in the probe itself, or in holding devices or in securement means or yet in sample carriers. Such interfering variances, which lead to hysteresis characteristics and/or to creep, are detected by piezo-ceramic units as these are found in the said actuator. The stated unwanted variances could result in cumulative error, which can alter the distance between the probe and the sample.

In the area of imaging atomic force microscopy and atomic force microscopy, up to the present, drifts in the course of the beam were intended to be compensated for by manual intervention. This was done when, the user observed from the value of the position detector that the cantilever was no longer in contact with the sample. A correction of the beam path was made by a manual adjustment of mechanical settings on an instrument board. In this way, the measuring laser beam was caused to fall once again on the desired target on the position detector.

In U.S. Pat. No. 5,077,473 is disclosed a method for compensation of drift in the x and/or y directions of a positioning apparatus for a sample. The positioning apparatus is driven by a piezo-actuator which is subject to drift signals in the x and/or y direction. This drift is compensated for, since to a control signal directed to the positioning apparatus an auxiliary signal is added, which compensates for the drift in the x and/or y directions.

The purpose of the invention is to make available an improved method for scanning force microscopy as well as for atomic force spectroscopy.

SUMMARY OF THE INVENTION

In accord with a first aspect of the present invention, a process for the execution of scanning probe microscopy, or scanning force microscopy (this being atomic force spectroscopy) encompasses, in accord with predetermined parameters, at least the following three steps:

1. the determination of a variance of value of at least one parameter,
2. the control of an adjusting member which reacts to a variance of value; and
3. the capability of carrying out a correction so that the variance of value is at least partially compensated for.

In accord with a second aspect of the present invention, an apparatus for scanning probe microscopy or for scanning force microscopy or for atomic force spectroscopy possesses a probe for any or all above microscopic methods, and has a sample carrier for the placement of a sample, and possesses:

1. a position detector, which determines the position of a measurement-beam, which has been reflected from the probe assembly, 2. an adjusting element, which is designed to move the sample carrier, 3. an adjusting member, and 4. a control which regulates the adjusting element relative to a determined value variance of the positional data, so that a variance of a true value is at least partially compensated for.

Additional aspects and features of the invention are to be found in the subordinate claims, in the following description of embodiments of the invention and in the attached figures pertaining to the invention.

BRIEF DESCRIPTION OF THE DRAWINGS

Embodiments of the present invention are schematically presented below in FIGS. 1 to 5. There is shown in.

A DESCRIPTION OF ADVANTAGEOUS EMBODIMENTS OF THE INVENTION

Figure 1:
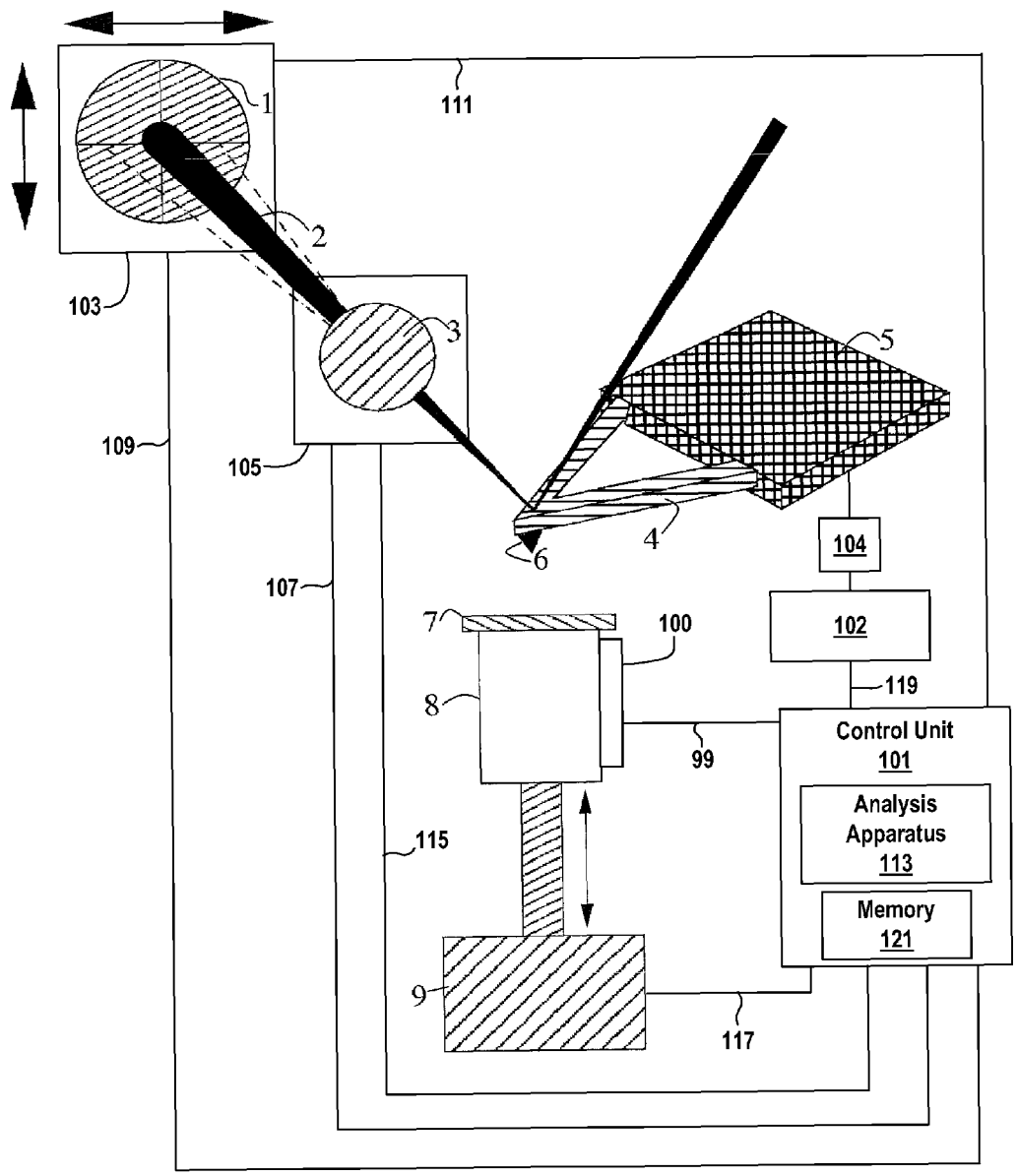
FIG. 1 a method for the compensation of a drift of a measuring-beam.

FIG. 1 shows an apparatus for compensation of drift of a measuring-beam in accord with a first embodiment of the present invention. Before providing here a detailed description of the apparatus shown in FIG. 1, general explanations follow of the embodiment examples:

Often, a measurement apparatus includes a scanning probe for microscopic or atomic force spectroscopic measurements with a carrier for placement of the sample. In the case of position sensing microscopic or atomic force spectrographic measurements, a sample is scanned by a probe within a predetermined grid pattern. When this is done, either the probe moves in well defined steps over the sample, or is held stationary and the sample moves thereunder by a carrier actuated by a positioning device. It is possible to move both the probe and the sample carrier simultaneously. Variances of the probe, which might be tunnel currents as per scanning tunnel microscopy, are transposed into visible form by display equipment. The sample to be moved is placed upon a carrier, which carrier is governed by a positioning unit so that the carrier can move in x, y and z directions. This equipment is designated as a "scanner". A scanner can possess actuators, namely piezo-actuators, which are designed to carry out the necessary movements in the nano-meter range.

In some cases, predetermined parameters, seldom in complete form, were designed to carry out scanning probe or atomic force spectroscopic investigations. During measurements, parameters would determine: position, force, distance of separation between a sample and a probe, diversions and the like and present same in readable form. For example, the parameters, in one instance, could include the position of a measuring-beam incident to a target on a position detector which gives a determination of the optical course of the beam.

Parameters could also determine the separating distance between a probe and a sample. Frequently, parameters include a variance of the position of the said measuring-beam, especially its degree of error in striking a central target on the position detector, which indicates error in the optical path of the beam. Parameters may include a variance of a positioning element for the sample carrier. The values of these parameters form a background, related in many cases, to variances which arise from thermal effects, surface irregularities, flow variance, creep or the like. Such effects lead to a situation, wherein materials suffer self-alteration. These materials can alter themselves in shape, dimensions, or/and in other characteristics, such as piezoelectric behavior, thermal conditions, change of phase, such as being solid, liquid or gaseous.

Often, such value variances of at least one parameter are detected and, if only partially, are automatically compensated for by an adjusting member (or by a control) which responds to the determined value variance. The adjusting member is so regulated by control override, that the variance at least partially receives compensation by counteracting measures.

To a certain extent, compensation of variance in a determined value is applied automatically. This is done by a fully automatic control for the apparatus which is designed not only to carry out measurements but also to automatically compensate a value variation.

The above described drifts carry variances departing from values or from measured data. Due to cantilever bending, the position of an incident beam changes as it approaches the position detector and thus a variance of the striking position of the beam occurs. The probe also possesses an unrestrained support structure, which can be described as an extending member or, hereafter, as a cantilever. A variance of the probe or of its supporting cantilever, is often detected by a laser beam and reflected onto a position detector. This position detector evaluates the position of the laser beam and correspondingly measures the variance of the cantilever. Influences of disturbances such as thermal and surface irregularities, can develop into the bending of the cantilever or diversion by lenses, mirrors, or detectors, all of which affect the laser beam. This leads to a variance of the path of the laser beam directed to the position detector. In order to obtain a correct force/piezo-position curve it is necessary that the position detector and the laser beam of the cantilever be mutually properly aligned. If this variance is not compensated for, then a true measurement signal can no longer be made or if recorded, then only with insufficient linearity. Frequently, this variance of the beam can, to a great part, be balanced out.

Frequently, an adjusting member is set by a user to maintain a determined position, so that a variation of this position is then partially compensated for. Likewise, prior to the start of a method for measurement, the beam is directed to a predetermined, usually central target on the position detector.

The adjusting member often has an integral beam element, which is designed to regulate the optical course of the beam. For this control, this beam element is generally placed between the position detector and the cantilever, so that the path of the reflected measuring beam is controlled by the beam element.

In other embodiments, the adjusting member possesses an apparatus, which is designed to move a position detector to match the movement of the beam.

Often, when a position of a beam has been determined, a signal from the position detector is evaluated, to allow the generation of a second signal to control the adjusting element.

Further, a drift of the entire measurement equipment or parts thereof, can cause a variance in the separating distance between the cantilever retained probe and the sample. Such a variance can also arise from a bending of the probe or its cantilever by thermal or surface irregularities. The variance can also have other causes, namely that parts of the force microscope lose alignment, so that the separation between probe and sample is seen as changing. The adjusting element, i.e., the piezo actuator itself can change in size. variances can also arise from hysteresis and/or from a creeping of the piezo ceramic device.

Typically, an adjusting element regulates the separating distance between the probe and the sample, which distance gives space within which a force existing between the two can act and on this account the distance is precisely defined. This adjusting element is usually located under the sample carrier and integrally includes an integral a piezo adjusting element. With the aid of the said adjusting element, the separation distance between the probe and the sample becomes well controlled. The drift, here being a variance of the separating distance between the probe and the sample can, become so large, that the effective range of the adjusting element becomes inadequate. Thus a start point of a force/piezo-position curve fails to be created, since the separating distance between the probe and the sample can be either too large or too small. Consequently, compensation is often made for such an alteration.

Consequently, any alteration of a variance of value must necessarily be analyzed. Frequently, an adjusting member is controlled in such a way, that the separating distance compensates itself in accord with the analysis of the variance. In this way, such a separating distance variance, which could have arisen from thermal or other disturbing influences can be compensated for.

Additionally, the adjusting member may possess a servo motor having a connection to the sample carrier or an adjustment element related thereto. The adjustment element could move the sample carrier along any or all of the three axes x, y and z. This would allow the sample to be examined and data stored for creating a force/piezo-position curve. The adjusting member could be differently located in some embodiments. The adjusting member may be placed underneath a sample carrier. Again, the adjusting member could be located between the sample carrier and the adjusting element, which latter adjusts the position of the sample carrier and therewith the position of the sample. Conversely, the adjusting member may be located underneath the adjusting element. In yet another version, the adjusting element has the capability of moving the probe.

In many embodiments, a determination must be made to discover if the force, which acts between the probe and the sample, reaches a defined value. For instance, a determination shows if the force attains a predetermined maximum value. Strong forces are generated when a thermally induced drift between probe and the sample causes a condition, wherein the range of the adjusting element of the sample carrier becomes exhausted. In such a case, the adjusting element can no longer increase the separating distance between the probe and the sample. Conversely, a determination may show, whether or not the value of the force finds itself below a minimal level, or again, even if a force relationship between the probe and the sample no longer exists.

Frequently, an analysis of force calls for at least a part of the of a force/piezo-position curve to be analyzed. That is, an analysis will show, that a correlation can exist between an already determined force and a position of the piezo-adjusting element. This correlation comprises linking a force value to a high value of an adjusting element. Due to the said high value of the adjusting element, (this being a variation in the z-direction), the separation distance between the probe and the sample is altered, whereby the high value acts directly upon the value of the force. On this account, the adjustment element can adjust only in a restricted range. By means of a drift in the system the separating distance can so increase or decrease that a force acts between the probe and the sample. When the adjusting element with its limited range can no longer influence the separating distance, the force is diminished, but still permissible.

An analysis of a force vs. piezo-position curve in many embodiments, that is, an analysis of force values and corresponding variance values of the adjusting element, emphasizes at least one of four points, the points being: offset, contact, trigger and/or VR points. The offset-point is that location at which the force/piezo-position curve begins, i.e., it is the first point on the force/piezo-position curve. The contact-point is that point at which the adjusting element is so set, that contact is established between the probe and the sample. This contact point is defined, in that an already determined force directed to the relative diversion value of the adjustment element increases itself over a recorded value which may have been previously established. At the trigger point, the force is greater than at any predetermined value. Hence the trigger point may be considered the end of the meaningful force/piezo-position curve. At this trigger-point, measurement data on a force/piezo-position curve terminates. The VR-point at the top of the upward sloped section, denotes the greatest value for the diversion of an adjusting element which has been defined by a user. VR value is achieved, if the force/piezo-position curve is carried out without activation of a trigger mode or when a trigger point has not been reached.

Frequently, in embodiments, an analysis of a force vs piezo-position curve includes a balance between a deviating value of an adjusting element and a set of predetermined values. The user selected predetermined value set includes, for instance, two value intervals. A first interval is seen on the abscissa as a lower safety zone and the second interval of values, at the other extreme, can be designated as an upper safety zone. The lower safety zone encompasses that minimal variance range, which the adjusting element can compensate for. The upper safety zone, correspondingly, includes a maximum variance range for the adjusting element. Either safety zone, when required by application, can be optionally increased in extent.

Frequently, an aim of an embodiment, is to determine whether a given point on the force/piezo-position curve lies in an intervening active range of values, or, conversely, lies in the upper or lower area of safety zones. Disclosure is sought if, specifically, the offset point lies in the lower safety zone or if the trigger point and the VR point are to be found in the upper safety zone, or again, or if the contact point lies neither in the lower nor in the upper safety zone. Frequently, a determination is made to establish whether or not all the named points on the force/piezo-position curve lie outside of the value range, while in another optional guideline of point-arrangement, all points are to be within one value range.

Often, compensation for variances of values is accomplished automatically prior to or during an analysis. This practice enables extensively long analyses to be carried out. Likewise, in such embodiments, drift of a measurement-beam is also automatically compensated for, prior to or during a measurement and the measurement-beam accordingly becomes target-centered on the position detector. Further, before or during a measurement (for example, at the start of a force/piezo-position curve) a drift between the probe and the sample must be balanced out. The separating distance between the probe and the sample is so controlled by its adjusting member, that the start of the force/piezo-position curve becomes possible, in spite of separation variations due to drift conditions. Thus, an automatic measurement method can be carried out, even one of long duration. Often, automatic measurements are enabled, under conditions wherein a drift, i.e., a variance of the separating distance between the probe and the sample, exceeds the adjustment range of an adjusting element for the sample carrier or for the probe.

Description With the Aid of Drawings

Reviewing FIG. 1, this schematic view shows an apparatus for scanning probe microscopy and/or atomic force spectrography, wherein, only such components as are relevant for explanation of the invention are presented. A measuring-beam 2 determines a variance of a cantilever 4 or of its probe 6. The cantilever is affixed to a holder 5 and is located above a sample during a measurement. Measuring-beam 2 is a laser beam, or may be a bundle of other electromagnetic waves. This beam 2 originates from a (not shown) beam-source and falls upon a reflecting element on cantilever 4. Reflected therefrom, the measuring-beam 2 passes through an intervening beam element 3, which can exert an effect on the beam 2. The beam element 3 incorporates in its assembly a mirror and/or a lens or yet another element which is enabled to influence the optical path of the beam 2. This measuring-beam 2, as here depicted, leaves the beam element 3 and impacts against the shown position detector 1. The position detector 1 thus acquires data as to the position of the incident beam 2.

The cantilever 4 carries a pointed probe 6, which can be moved in relation to the sample, which sample rests upon a carrier 7. The probe 6 may be moved in relation to the carrier 7 by an adjusting element 102 having a probe drive 104 connected to the probe 6 that moves the probe 6. An adjusting element 8, for instance a piezo-ceramic, can move the sample and its carrier 7 along any, or all, three mutually perpendicular directions, these directions being the axes x, y and z. The adjusting element 8 may be an electro-piezo device. The position of the adjusting element 8 in relation to the probe 6 may be selectively established by an adjusting member 9 having a drive 62 (see FIG. 5) that moves the adjusting element 8. In many cases during an atomic force microscopic analysis of a biological sample, at the start of a force/piezo-position curve, a motion is enabled in only one direction (for instance, along the z-axis 100, that is, perpendicular to the sample carrier 7). In FIG. 1 the z-axis lies vertically disposed as seen in the plane of the drawing. In order to analyze a sample, that sample with its carrier 7 is to be displaced in the z-direction by its adjustment element 8 until contact is made between the probe tip 6 and the sample. Due to atomic alteration, here defined as "force", which acts between probe and sample, whereby the cantilever 4 bends, causing a diversion of the beam 2. By displacing the sample and its carrier 7 in x and y plane, the surface topography of a sample becomes evident. Additionally, in the case of atomic force microscopic measurements, it is possible, using a known spring constant of the cantilever 4, to define a force, which acts between the probe and the sample in quantitative terms as an alternation between individual molecules of the sample.

The said scanning probe microscopic or atomic force spectroscopic measurements are carried out by precise, predetermined adjustment parameters. Disturbing conditions, such as thermal effects or surface characteristics, can cause drift in these parameters, which leads to false measurement results. For example, the cantilever 4, due to external thermal conditions, can bend or be distorted, whereby the measuring-beam 2 must suffer a directional diversion, whereby the result of a measurement becomes erroneous. The cantilever 4 itself can be deformed through surface conditions, degradation of material or other external influences. A resulting diversion of the measuring-beam can be captured by the position detector 1, since, as a consequence of the diversion, the position of incident impact of beam 2 on the position detector 1 is altered.

These undesirable diversions of the measuring-beam 2 disturb, for example, the starting point of a force/piezo-position curve within the scope of an atomic force spectrographic measurement. On this account the position detector and the measuring-beam 2, which is reflected from an unrestrained cantilever, are often positioned in a predetermined relation to one another. The cantilever 4 (carrying the probe 6), under these circumstances, is "free", because the probe 6 is not in contact with the sample. This positioning of the measuring-beam 2 is carried out in two ways, which can be combined. Frequently an adjusting member 103 displaces the position detector 1 in such a manner, that an unwanted deviate placement of the measuring-beam 2 is compensated. In FIG. 1, this method is schematically described by the illustration of both double-headed arrows. The position detector 1 assumes a function as an adjustment parameter to such an extent, that the measuring-beam 2 strikes the position detector 1 at an essentially central target. Often, conversely, the beam element 3 is so altered in direction by an adjusting member 105, that a variation of the measuring beam 2 is compensated for. Even in this instance, it is also possible that the measuring-beam 2 becomes displaced, due to a thermal drift of at least a part of the system and must then be repositioned, that is, be once again aimed at a central target on the adjustable position detector 1. In another instance, the position detector 1 is moved and the beam element 3 is adjusted, in order that the undesirable variation of the measuring-beam 2 can be countered. In such examples, accordingly, both the position detector 1 and the measuring-beam 2 are to be successively advantageously realigned.

The control of the adjusting member 103 of the position detector 1 and/or that of the adjusting member 105 for the beam element 3, is accomplished by a respective control signal 107, 109 issued from an overriding control or control unit 101. This generated control signal 107, 109 is based on a positioning signal 111 which governs the placement of the measuring-beam 2 on the position detector 1. The said positioning signal 111 may be in digital or in analog form and, based on this, a control signal 107, 109 for the adjusting member 103 or adjusting member 105 is generated. The signaled adjusting member now acts so that the measurement beam 2 impacts the position detector 1 in such a way, that the effects due to thermal conditions or surface responses of the cantilever 4, which resulted in variance of the measuring beam 2 on the position director 1, are at least partially compensated for.

The control signal 111, which, as above, is generated by the position detector 1, is so designed, that a control of the adjusting member 103, 105 becomes effective in at least one plane. In another embodiment, a corresponding adjusting member 103, 105 can be active in all three planes, in order to move the position detector 1 or the beam element 2 not only laterally, but also to effect a tilting or a rotary adjustment. This is useful if the measuring-beam 2 is not approaching the position detector 1 perpendicularly. To carry out such an operation, the adjusting member 103, 105 must be supplied with a motor (not shown) and be so regulated, that the beam element 3, or the position detector 1, can be tilted, moved or rotated in the required direction.

The above cited method and its apparatus is designed to carry out the purposes of the invention and can be operated in different ways. In many embodiments the start of a procedure for exact adjustment, or for compensation is determined by user input. In some embodiments the start is automatic. This latter can be safely carried out, because the drift possesses a known threshold value and has attained an already disclosed trigger value, which can serve compensation parameters, and thereby release a start operation. Often, between start-points of force/piezo-position curves, the positioning of measuring-beam 2 on the position detector 1 is examined when the cantilever is unrestrained. By recording different values of position of the start points of force/piezo-position curves, a determination of a drift of the system can be made. This drift could be, in part, a bending of cantilever 4. If the drift attains an predetermined threshold, this being for instance, a variation of position, then this drift is automatically balanced out. Before the start of a new measurement, the position of the measuring-beam 2 on the position detector 1 is determined and any drift of the measuring-beam is subjected to compensation.

Figure 2:
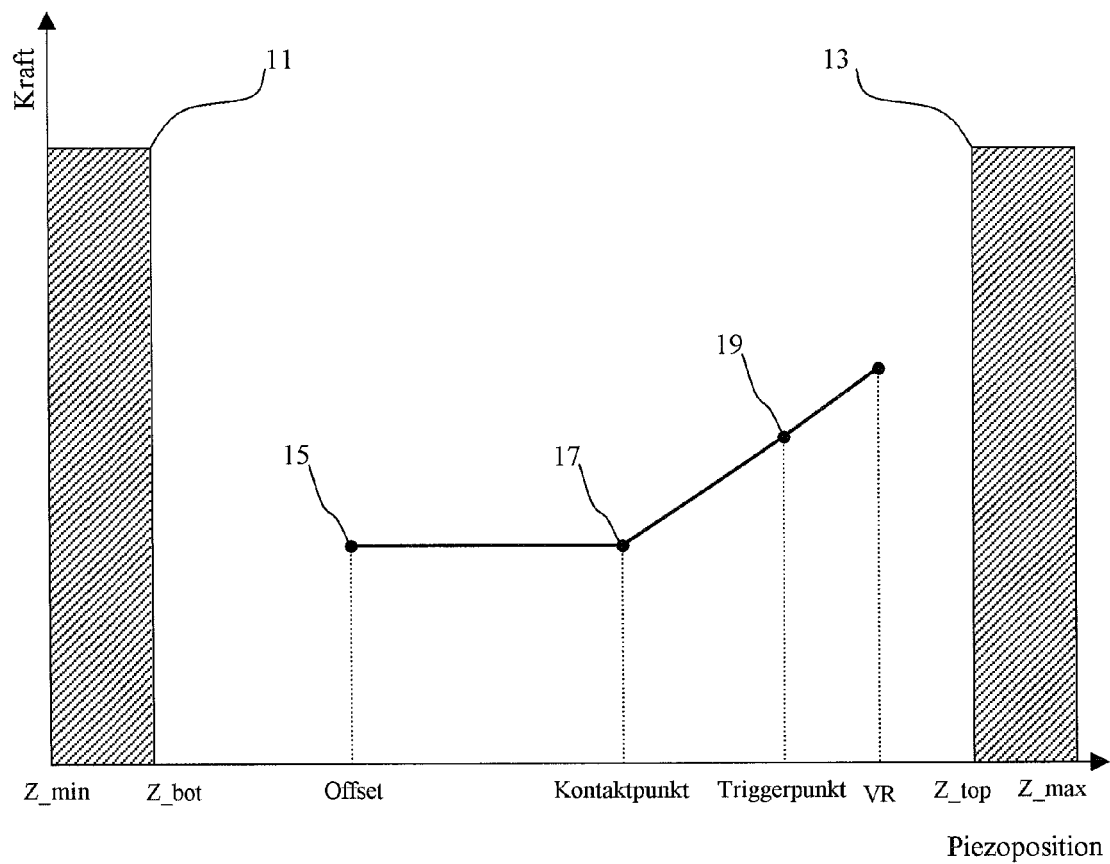
FIG. 2 a force/piezo-position curve showing labeled points of activity.

FIG. 2 shows an exemplary force vs piezo-position curve of a scanning probe or an atomic force spectroscope examination of an embodiment. The displacement data used in formulating the curve is obtained from a displacement transducer 100 (see FIG. 1) operatively connected to the piezo-ceramic adjusting element 8 as is known in the atomic force measurement art, the transducer 100 generating a data signal 99 representing the displacement of the piezoelectric adjusting element 8. In many examples, as might be seen in atomic force spectroscopy, these were confronted by at least two challenges regarding quality of the curves. The challenging questions are: first, should the force with which the probe presses on the sample be limited, and second, should the force/piezo-position curve be provided with such a sufficient length, that it becomes possible to delineate the expected occurrences. The force/piezo-position curve of FIG. 2 extends itself over three points, namely, an offset point 15, a contact point 17 and a trigger point 19. In the embodiment examples more or even fewer points on a force/piezo-position curve are subject to determination. Often, only that force is shown, which the probe exerts against the sample. The offset point 15 defines the start of the force/piezo-position curve, while the contact point 17 indicates, that a contact has been created between the probe and the sample. This latter situation also becomes evident by an increase in the slope of the curve. The force/piezo-position curve terminates at the trigger point 19, when the force reaches a threshold value. From this trigger point on, the situation is, that if greater force be exerted between the probe and the sample, one of these two mechanical elements will be damaged. The force/piezo-position curve, can, under these circumstances, end at the VR-point. At the VR-point the variation of the adjusting element reaches its greatest level, which level a user has preselected for the force/piezo-position curve. The ordinate in FIG. 2 shows, first, a continually increasing value of a force, which exists between a probe and the sample as well as indicating a corresponding variation of a cantilever. Second, the abscissa denotes the value of a variation of an adjusting element, possibly a piezo-element, which increases itself toward the right (refer to adjusting element 8, as in FIG. 1). The abscissa thus denotes a variation value of the adjusting element as being a location of the piezo adjusting element, i.e., designated as the piezo-position. FIG. 1 shows a lower safety zone 11 and also a higher safety zone 13. The lower safety zone extends itself between a minimal piezo-position $Z_{min}$ and a lower piezo-position $Z_{bot}$. The higher safety zone 13 extends itself between an upper piezo-position $Z_{top}$ and a maximum piezo-position $Z_{max}$. These piezo-positions present the possibly attainable minimal and the maximal variations of the adjusting elements. The piezo-positions $Z_{bot}$, $Z_{top}$, however, can be optionally preset in embodiment examples.

In order to compensate for a drift of the system, which could lead to a variance of the separating distance between the probe and the sample, in many embodiments, a force/piezo-position curve of the longest possible length is achieved, allowing that for each new start of a curve, a corresponding offset value is deducted from the determined trigger point. This creates a new offset point, and hence a new start-point for the curve.

Often, this kind of compensation for drift is insufficient, as will be made plain in FIGS. 3 and 4.

Figure 3:
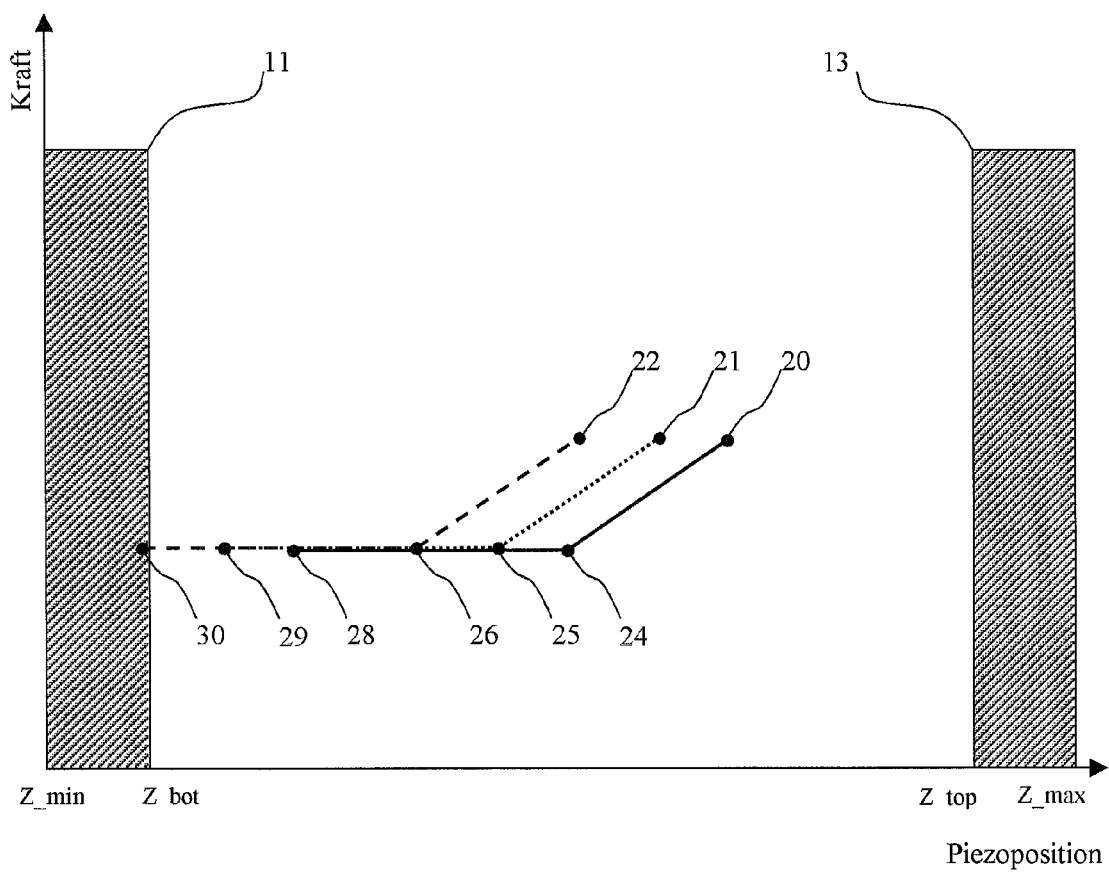
FIG. 3 the development of a drift between probe and a sample, wherein the separating distance between probe and sample is diminishing, FIG. 4 the development of a drift between a probe and a sample, wherein the separating distance between probe and sample is increasing, and FIG. 5 an exemplary schematic drawing, of an invented apparatus for the compensation of drift shown in FIG. 3 and FIG. 4.

FIG. 3 shows the start of three force/piezo-position curves, defined by, first, a solid line, second a dotted line and third a dashed line whereby a drift in the system is created and accordingly, the separating distance between the probe and the sample is diminished. FIG. 3 indicates that the curve is displaced to the left as each new starting point is established. The trigger points 20, 21, 22 likewise migrate to the left, as do the contact points 24, 25, 26 and the offset points 28, 29, 30. In a case of a many curve starting points, the force/piezo-position curve retracts so far to the left, that offset point 30 finds itself within the left (lower) safety zone 11. Because variance of the adjusting element is limited, a start of yet another curve is no longer possible.

Figure 4:
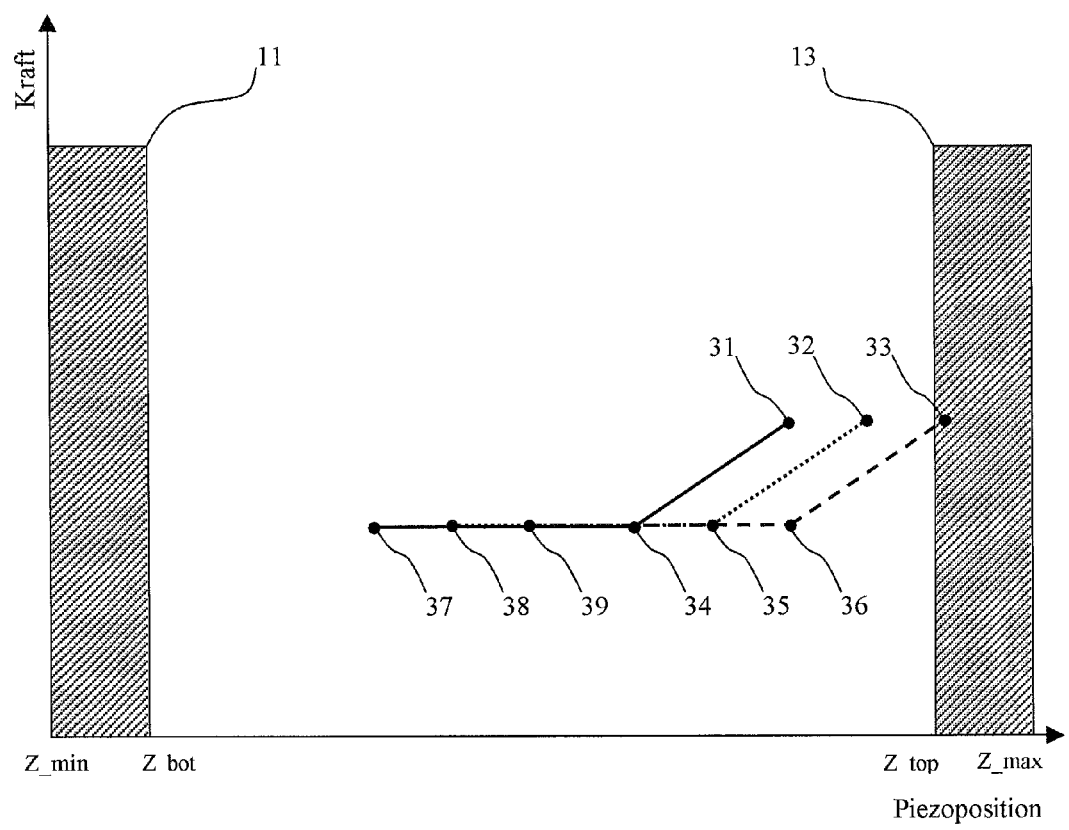

Conversely, FIG. 4 shows drift action, in which the separating distance between the probe and the sample increases. In this case, the three force/piezo-position curves, defined by, first, a solid line, second by a dotted line and third by a dashed line move to the right at each new start of a curve. The result of this variance is, that the trigger points 31, 32, 33, the contact points 34, 35, 36 and the offset points 37, 38, 39 shift to the right, terminating when the trigger point 33 falls within the right safety zone 13 (upper). Because variance of the adjusting element is limited, a start of yet another curve is no longer possible.

In both cases shown in FIGS. 3, and 4 the range of variance of the adjusting element, in responding to drift, eventually becomes exhausted. When it is obvious that the range of an adjusting element is exhausted, a known practice is to increase or decrease the separating distance between the probe and the sample by an adjusting member, so that additional starting points on force/piezo-position curves can be achieved, even if these overstep the preset range of the adjusting element. Accordingly, on the basis of the force/piezo-position curve, an analysis is carried out to determine whether the offset point has migrated into the lower safety zone 11 or the trigger point and the VR point have entered the upper safety zone 13. Next, the position of the force/piezo-position curve within the maximum piezo stretch is defined, to discover if the drift between the probe and the sample has reached either one of the safety zones. In accord with each start point of a force/piezo-position curve, an examination is made to see if:

(1) the offset point of the force/piezo-position curve lies within the lower safety zone 11 (refer to FIG. 3), (2) the trigger or VR-point of the force/piezo-position curve lies within the upper safety zone 13 (refer to FIG. 4).

In case (1) above and prior to the next start-point of a force/piezo curve, the adjusting member 9, including the entire assembly of adjustment element 8, sample carrier 7 and sample with probe are so treated, that the separating distance between the probe and the sample is increased to such an extent, that a subsequent force/piezo-position curve will lie between the two safety zones 11 and 13. To change the distance between the probe and the sample, the control unit 101, for example, can send a control signal 117 (see FIG. 1) to the adjusting member 9. Accordingly, the offset point of the next force/piezo-position curve, would be so selected, that the curve would lie centered within the range of an adjusting element (i.e., between the two safety zones 11 and 13).

In case (2) prior to the variance of the adjusting element by the adjusting member, the variance of the adjusting element is retracted, that is, it is set upon the minimal variation value $Z_{min}$. Then, the adjusting member influences the adjusting element so that the separating distance between the probe and the sample is so diminished, that a subsequent force/piezo-position curve lies between the two safety zones 11 and 13. Correspondingly, the offset point for the next curve would be so chosen, that the force/piezo-position curve would lie in the central zone of the maximal adjustment range of the piezo-position element.

Figure 5:
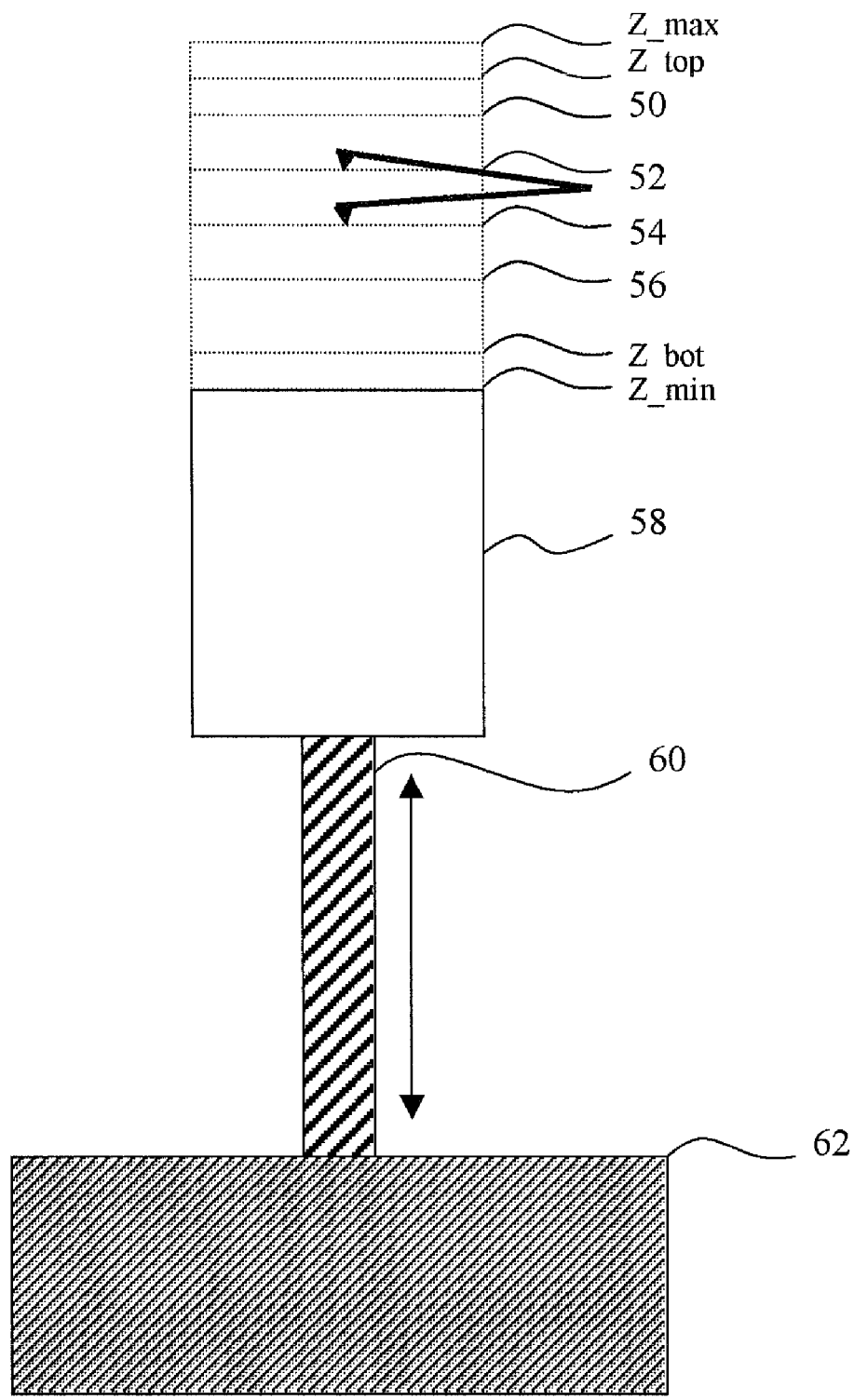

FIG. 5 shows coaction between the adjusting member and the adjusting element 58. The adjusting member includes a drive 62, that is, a servo-motor, and a slide-unit 60, which the drive 62 moves up and down along the z-axis. The adjustment element 58 possesses a piezo-adjustment element, the possible placements of which in the z-direction are shown by horizontally drawn dotted lines. Adjusting element 58 possesses a minimal variation $Z_{min}$ and a maximum variation $Z_{max}$, within which limits the element can operate. Furthermore, in FIG. 5 is illustrated a lower safety zone between $Z_{min}$ and $Z_{bot}$ and an upper safety zone between $Z_{top}$ and $Z_{max}$.

Between the lower and the upper safety zones, a plurality of positions of variation are marked for the adjusting element 58, which positions represent the already stated points on a force/piezo-positions curve. The points are:
 56 variation of an offset point,
 54 variation of a contact point,
 52 variation of a trigger point, and
 50 variation of a full ramp (top of slope) (VR).

If, during an analysis, a determination has been made, that because of a drift of the system, the variation possibilities of the adjusting element 58 are exhausted, then the adjusting member will be so controlled, that the separating distance between the probe and the sample is accordingly increased or decreased and the next force/piezo-position curve will find itself placed centrally in the variation zone of the adjusting element 58 as shown in FIG. 5.

Instead of the offset point or the trigger point, it is possible that other characteristic points on the force/piezo-position curve, such as the contact point, for instance, could be determined from the curve. This would disclose if the force/piezo-position curve invades the lower or the upper safety zones.

The above described examples of method, mode of operation, and apparatus of the present invention are activated in various ways. Frequently, the invented method has been automatically carried out by a computer program, which regulates the control or control unit 101. Alternately, method data can be integrated into the control unit 101, under which circumstances, it would automatically carry out a measurement utilizing a scanning probe microscope or an atomic force microscope.

The control unit 101 of an embodiment often possesses a microprocessor and an analyzer (collectively represented as an analysis apparatus 113 in FIG. 1) to receive and process data. Data represented by the data signal 111 are delivered from a position detector 1 and disclose the position of a measuring-beam on the target area thereof. Data, such as a data signal 115 from the adjusting element 105, displacement data 99 related to the adjusting element 8, or a data signal 119 from the adjusting element 102 are often available from an adjusting element, which data discloses the actual variation of the said adjusting member. The control unit 101 and/or an analysis apparatus 113 therein can receive data on that force which acts between the probe and the sample. The control unit 101 may determine force data itself, based on positional information and/or a therein integrated microprocessor can also calculate force data from this source.

The control unit 101 may frequently incorporate a memory device 121 (see FIG. 1), within which force/piezo-position curve data can be stored. The memory device can also retrievably retain values, such as the threshold limit for a force or a variation or the like and produce the same for machine or user readout. In such embodiments the microprocessor can provide a force/piezo-position curve with trigger, offset points, other preselected points, data, or data on points which define a safety zone. If desired, the memory device may store the maximum and the minimum variation range of an adjusting element and/or of an adjusting member.

Frequently, the analysis apparatus analyzes data generated from, for instance, a position detector, an adjusting element, an adjusting member or force data and the like. Having such data the analysis apparatus can produce a control signal directed to an adjusting member. This signal controls the adjusting member so that a drift of a variance of value would be compensated for, wherein the variance might concern a force or a position of the measuring-beam incident to the position detector or could concern the separating distance between the probe and the sample. Frequently, many of the above embodiments are presented together or mixed. Combinations with embodiments of different characteristics can be advantageously made.

The invention claimed is:

1. A method for carrying out scanning probe microscopic or atomic force spectroscopic measurements of a test sample using predetermined parameters, the method comprising the steps of:
 (a) displacing one or more times a probe relative to a test sample utilizing an adjustment element that displaces the probe relative to the sample to make one or more measurements,
 (b) obtaining displacement data related to the displacement of the adjustment element for each measurement taken in step (a),
 (c) determining a variation in value of at least one of the predetermined parameters, the variation in value comprising the variation of the displacement data of the adjustment element,
 (d) analyzing the variation of the displacement data including determining whether or not the variation in displacement data lies within a predetermined range of displacement values, and
 (e) adjusting the distance between the sample and the probe if the variation in displacement data does not lie within the predetermined range of displacement values such that the displacement of the adjustment element lies within the predetermined range of displacement values during one or more succeeding a measurements.

2. A method in accord with claim 1, wherein the variation in displacement is caused by thermal effects.

3. A method in accord with claim 1, wherein the variation in displacement is due to surface effects.

4. A method in accord with claim 1, wherein step (b) comprises the step of:
 (f) obtaining force data related to the atomic force which acts between the probe and the sample,
 and wherein step (d) comprises the step of:
 (g) analyzing the variation of the force data including determining whether or not the variation in force data lies within a predetermined range of force values, and wherein the method further comprises the optional step of:
(h) moving the relative position of a measurement beam with respect to a position detector if the variation in force data does not lie within the predetermined range of force values.

5. A method in accord with claim 4, wherein step (g) comprises the step of:
(i) determining whether or not a force reaches a predetermined maximum value.

6. A method in accord with claim 4, wherein step (g) further comprises the step of:
(i) analyzing a plurality of force values whereby the associated displacement values of the adjustment element are determined.

7. A method in accord with claim 6, wherein step (h) further comprises the step of:
(j) determining at least one of the following points: offset point, contact point, trigger point and VR point.

8. A method in accord with claim 7, wherein step (j) comprises the step of:
(k) determining whether or not at least one of the points determined in this step (k) lies in a predetermined range of point values.

9. A method in accord with claim 1, wherein the predetermined range of displacement values includes a first range of displacement values representing a minimal allowable displacement of the adjustment element and a second range of displacement values representing a maximal allowable displacement of the adjustment element.

10. A method in accord with claim 9, wherein step (e) comprises the step of:
(f) adjusting the distance between the sample and the probe such that displacement of the adjustment element lies outside of the first and the second range of values.

11. A method in accord with claim 1 wherein step (a) comprises the step of energizing a piezo-actuator and step (e) comprises, when adjusting the distance between the probe and the sample, the step of displacing at least one of the following elements (f), (g) and (h): (f) the sample, (g) the probe, and (h) the piezo-actuator.

12. An apparatus for making scanning probe microscopic or atomic spectroscopic measurements, the apparatus comprising:
a measuring equipment comprising a probe adapted to carry out at least one of scanning probe microscopic and atomic force spectroscopic measurements and a sample carrier for the placement of a sample to be measured,
a position detector adapted to determine the position of a measuring beam reflected from the probe,
an adjustment element adapted to displace the sample carrier relative to the probe when making a measurement,
an adjustment member operatively connected to the adjustment element to selectively vary the distance between a sample in the sample carrier and the probe, and
a control unit configured to:
(a) determine a variation in value of displacement data of the adjustment element,
(b) analyze the variation of the displacement data including determining whether or not the variation in value lies within a predetermined range of values, and
(c) control the adjustment member to control the distance between a sample and a probe depending on the analysis such that the variation in value lies within the predetermined range of values during a measurement and/or prior to at least one succeeding measurement.

13. An apparatus in accord with claim 12, wherein the displacement variation is caused by thermal effects.

14. An apparatus in accord with claim 12, wherein the displacement variation is caused by surface effects.

15. An apparatus in accord with claim 12, wherein the adjustment member is configured for one of the following (a) and (b): (a) to move the adjustment element together with the sample carrier and (b) to move the probe.

16. An apparatus in accord with claim 12, wherein the adjustment member moves the position detector.

17. An apparatus in accord with claim 12, wherein the adjustment member is configured to move a beam element which is designed to adjust the optical path of the measuring beam.

18. An apparatus in accord with claim 12, wherein the value variation includes the variation of the position data of the measuring beam and the control unit is configured to determine a force which acts between the probe and the sample.

19. An apparatus in accord with claim 12, wherein the control unit is configured to analyze the variation of the displacement data of the adjustment element, and based on the analysis of these data, to determine variation of the displacement data.

20. An apparatus in accord with claim 19 wherein the probe is adapted to carry out measurements generating force values, and wherein the control unit, basing its action on the force values and the associated variance of the displacement data, determines at least one of the following points: offset point, contact point, trigger point and VR point.

21. An apparatus in accord with claim 20, wherein the control unit is configured to determine whether or not at least one of the points lies in a predetermined range of values.

22. An apparatus in accord with claim 20, wherein a first predetermined range of values includes values of minimal displacement of the adjustment element and a second predetermined range of values includes values of maximal displacement of the adjustment element, and the control unit is configured to control the adjustment member such that at least one of the points lies between the first and the second range of values.

23. An apparatus in accord with claim 20 wherein the adjustment element comprises a piezo-actuator and the adjustment member comprises a drive connected to at least one of the following elements (a), (b), and (c): (a) the sample carrier, (b) the probe, and (c) the piezo-actuator, the drive operable to displace the at least one element connected to said drive.

24. An apparatus in accord with claim 12, wherein the control unit is configured to produce a relation between a force which acts between the probe and a sample and the variation of the displacement data.

* * * * *